(12) United States Patent
Ollila et al.

(10) Patent No.: US 6,451,444 B1
(45) Date of Patent: Sep. 17, 2002

(54) WOOD BASED PLATE PROVIDED WITH SURFACE AND METHOD TO PROVIDE THE SURFACE

(75) Inventors: Timo Ollila, Joensuu; Marjaliisa Asikainen; Arto Juvonen, both of Savonlinna, all of (FI)

(73) Assignee: Schauman Wood Oy, Lahti (FI)

( * ) Notice: Subject to any disclaimer, the term of this patent is extended or adjusted under 35 U.S.C. 154(b) by 0 days.

(21) Appl. No.: 09/654,411

(22) Filed: Sep. 1, 2000

Related U.S. Application Data

(63) Continuation of application No. PCT/FI99/00203, filed on Mar. 17, 1999.

(30) Foreign Application Priority Data

Mar. 20, 1998 (FI) .................................................. 980640

(51) Int. Cl.$^7$ ........................... B32B 21/08; B32B 27/10
(52) U.S. Cl. ................. 428/479.6; 428/423.5; 428/425.3; 428/477.4; 428/414; 428/475.2; 428/476.9; 428/481; 428/537.1; 428/537.5
(58) Field of Search ........................ 428/479.6, 423.5, 428/425.3, 477.4, 476.9, 427.4, 475.2, 414, 481

(56) References Cited

U.S. PATENT DOCUMENTS

| | | |
|---|---|---|
| 3,544,669 A | 12/1970 | Schock |
| 4,143,187 A | 3/1979 | Pilgrim et al. |
| 4,205,107 A | 5/1980 | Jaschke et al. |
| 4,363,689 A | 12/1982 | Roesier |
| 4,743,509 A | 5/1988 | Kokrhanek |

FOREIGN PATENT DOCUMENTS

| | | |
|---|---|---|
| DE | 41 21 598 A1 | 1/1993 |
| DE | 42 22 832 A1 | 1/1994 |
| EP | 0 035 168 A1 | 9/1981 |
| EP | 0 782 917 A1 | 7/1997 |
| JP | 4208458 | 7/1992 |
| JP | 5177769 | 7/1993 |
| JP | 7223206 | 8/1995 |
| WO | WO 96/32257 | 10/1996 |

OTHER PUBLICATIONS

PCT Search Report dated Jul. 10, 1999 relating to PCT Patent Application No. PCT/FI 99/00203.

*Primary Examiner*—James J. Seidleck
*Assistant Examiner*—Melanie Bissett
(74) *Attorney, Agent, or Firm*—Fitch, Even, Tabin & Flannery

(57) ABSTRACT

A surfaced wood-based board comprises a substrate (1) made of wood material and, on it, a surfacing (2) comprising at least one thermoplastic layer. The surfacing incorporates a polyamide film (2b), which has been glued to the surface of the substrate (1) by means of a reactive adhesive layer (2a). The adhesive layer (2a) is based on phenolic resin, polyester resin, epoxy resin, isocyanate adhesive or polyurethane adhesive, and it is an adhesive film impregnated with reactive adhesive, such as an impregnated paper. A surfaced board is produced by hot-pressing, which is used to attach the films to each other and the substrate.

19 Claims, 2 Drawing Sheets

WOOD BASED PLATE PROVIDED WITH SURFACE AND METHOD TO PROVIDE THE SURFACE

Figure 1:
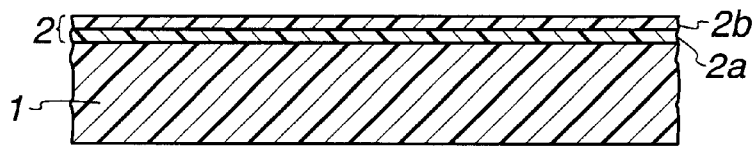

This is a continuation, of prior application number PCT/FI99/00203, filed Mar. 17, 1999. designating the U.S., which is hereby incorporated herein by reference in its entirety.

The object of the present invention is a surfaced wood-based board which is of the type presented in the preamble to the adjoining claim 1. Another object of the invention is a method for surfacing a wood-based board which is of the type presented in the preamble to the adjoining claim 11.

It is known to surface wood-based boards, such as plywood, particle board, fibreboard or other board, for example board made of sawn timber, with plastic surfacing to improve their surface properties, such as wear resistance or moisture resistance. In such case the surfacing film should be durable, but, however, should adhere strongly to the surface of the wood-based material.

Wood-based surfaced boards are used, for example, in the transport vehicle industry as wall and floor material for various cargo spaces, in the walls of moulds for casting concrete, and for other purposes Many thermoplastics are promising in that a suitable surfacing material can be chosen from among them according to the characteristics required from the product when it is used. Thermoplastics can also be worked using heat, and they can be melted/softened and solidified by adjusting the temperature, by means of which they can also be made to adhere to various surfaces. Thermoplastics can also be worked when molten, which enables them to be spread on surfaces by means of extrusion, and allows the forming of various profiles.

The problem of thermoplastics concerns their adhesion to substrates such as wood or wood-derived products. The high melt viscosity of the thermoplastics that are most frequently used makes it more difficult to attach the films by means of extrusion to the surface of wood. In addition, the unevenness of the substrate and the moisture contained by it may make it difficult to attach the film. Methods for surfacing wood-based boards with thermoplastic polymer particularly to improve the adhesion of the films are presented, for example, in Finnish patent 80637 and U.S. Pat. Nos. 3,544,669 and 4,143,187.

Similarly, a method for producing plastic/plywood composite is known from the international publication WO 96/32257, in which the surface of the plywood is subjected to special treatment (drying and crushing of the surface cells), after which a plastic film, such as a polyester film, surfaced with thermoplastic acting as a hot-melt adhesive can be affixed to the surface of the plywood with heat and pressure.

The aim of the invention is to present a surfaced wood-based board that does not require pre-treatment the substrate, but which can be surfaced with surfacing materials of various types containing thermoplastic, where the outermost surface of the surfacing materials can be chosen according to the demands of the application. For achieving this aim, the board relating to the invention is characterised mainly by what is presented in the characterising part of the adjoining claim 1. The surfacing has been provided by gluing a polyamide film to the surface of the substrate with a reactive adhesive layer. Polyamide film functions as a good substrate for other layers, for example, polyolefin layers, whereas a reactive adhesive, which most preferably has been absorbed in the carrier to form a uniform adhesive film, has good adhesion both to a wood-based substrate and to polyamide polymer.

As regards other preferred embodiments, reference is made to the adjoining dependent claims and the specification presented below.

Another aim of the invention is to present a method for surfacing wood-based board. For achieving this aim, the method is mainly characterised by what is presented in the characterising part of the adjoining claim 11. A crucial stage of the method is the gluing of the polyamide film to the wood-based substrate by means of a reactive adhesive layer. In the method, the polyamide film can function as a carrier for other, outer layers, and the method can be implemented by means of work methods known from wood laminating technology, particularly by means of hot-pressing. In addition, the formation of the surface can be carried out in one or more stages.

As regards other preferred embodiments of the invention, reference is made to the adjoining dependent claims and the specification presented below.

Figure 2:
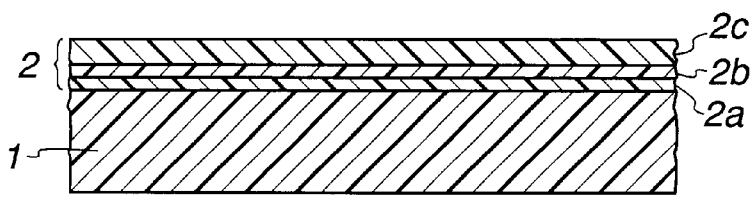
Figure 3:
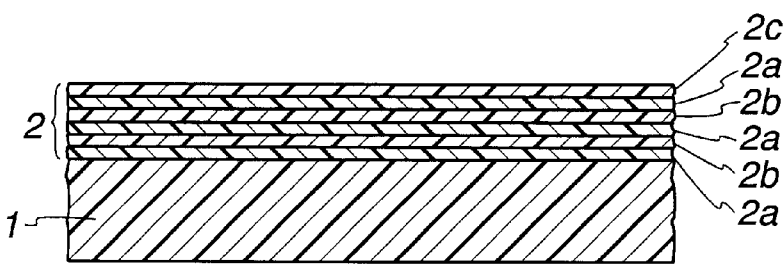
Figure 4:
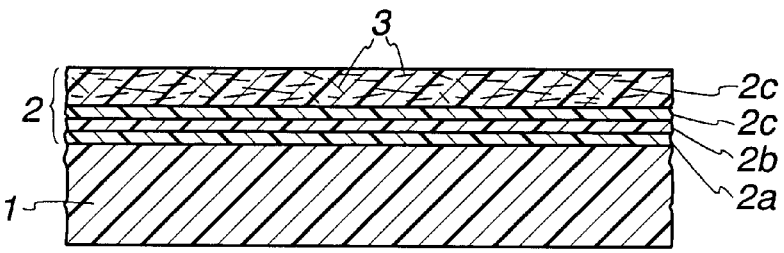
Figure 5:
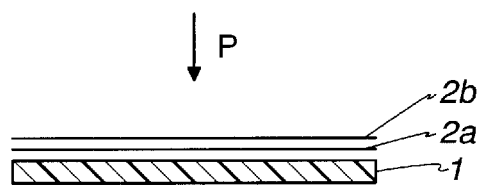
Figure 6:
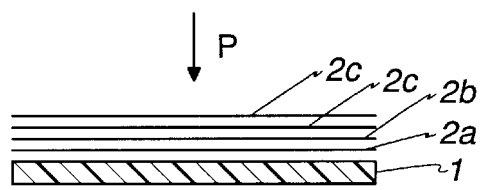
Figure 7:
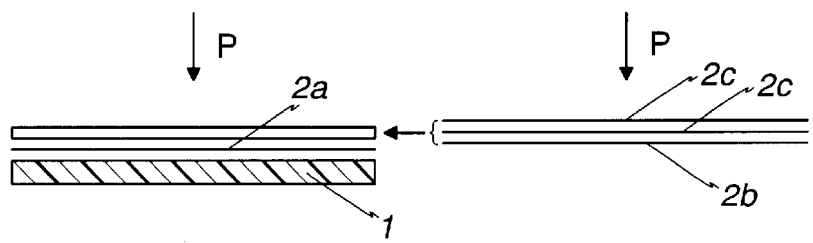
Figure 8:
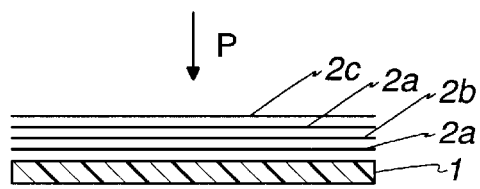
Figure 9:
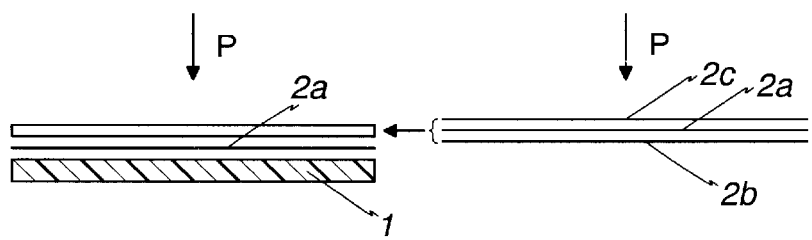

The invention is described in greater detail in the following, with reference to the appended drawings, in which FIG. 1 shows a cross-section of the surfaced wood-based board relating to the invention, FIG. 2 shows a coss-section of a second embodiment, FIG. 3 shows a cross-section of a third embodiment, FIG. 4 shows a cross-section of a fourth embodiment, FIG. 5 shows the first principle of the method relating to the invention for surfacing a board FIG. 6 shows a second principle for surfacing a board FIG. 7 shows a third principle for surfacing a board, FIG. 8 shows a fourth principle for surfacing a board, and FIG. 9 shows a fifth principle for surfacing a board.

FIG. 1 shows a surfaced wood-based board, consisting of a board-like substrate 1 made of wood material and the surfacing 2 on it. In this alternative, which has the simplest structure, the surfacing only has one polyamide film 2b, which has been glued by its lower surface by means of a reactive adhesive layer 2a to the surface of the substrate 1.

The polyamide film can be a film made of some known type of polyamide, which can be glued to the substrate 1 as a ready-made, solid film. The adhesive film 2a can contain some known reactive, generally heat-setting adhesive, examples of which include phenolic resins, polyester resins, epoxy resins, isocyanate adhesives and polyurethane adhesives, which adhere well to polyamide. The reactive adhesive has, in its non-reactive form, most preferably been absorbed into a carrier material with an extensive surface, such as paper or other porous, thin structures, to enable it to be placed as a single film between the substrate 1 and the polyamide film 2b, before bringing the adhesive to an adhering state using external factors, such as temperature. As for the substrate 1, it can be made of some wood-based material, such as plywood, particle board, fibreboard or other wood-derived mateal having larger or smaller parts attached together. The substrate can also be made of sawn timber. Likewise, it is also possible to have a substrate made of the above-mentioned materials by means of lamination or to have a substrate where only the surface layer is made of wood-based material. The substrate 1 is structurally a rigid board whose two dimensions which are perpendicular to each other (width and length) are greater than the dimension perpendicular to these (thickness).

FIG. 2 shows another embodiment, in which the layer glued to the substrate 1 by means of a reactive adhesive layer 2a is a laminate, in which there is already another thermoplastic film 2c on top of the lowest polyamide film 2b before the said adhesive layer is glued to the substrate. This thermoplastic film is made of some other polymer than polyamide, preferably of polyolefin, such as polypropylene or polyethene or some mixture of polyolefin polymers. A common polyolefin is polypropylene. It is possible for there to be even more layers in the laminate, attached directly on top of the above-mentioned layers, for example, on top of the film 2c made of another thermoplastic, which is on top of the polyamide film 2b, there may be one more film, which is again made of some other polymer than the film underneath. For example, on top of the polyolefin film 2c laminated directly onto the polyamide film 2b, there may be a polyamide film or another film which differs from polyolefin in terms of its polymer structure again directly laminated onto it. The outermost film may contain an UV protective agent.

FIG. 3 shows an embodiment in which there are alternately reactive adhesive layers 2a and thermoplastic films 2c on the polyamide film 2b glued to the substrate 1. These thermoplastic films are also preferably made of polyamide, which has good adhesive properties as regards the above-defined hardenable adhesives, in which case the amount of polyamide surfacing can be increased by placing adhesive films 2a and polyamide films 2b alternately on top of each other. Here it is also possible to have an alternative in which the outermost layer of the surfacing 2 is formed as shown in FIG. 2, i.e. is a laminate made of a polyamide film 2b and a film 2c made of another thermoplastic. Also in this case the outermost film 2c can be made of polyolefin, such as polypropylene or polyethene or some compound of polyolefin polymers, preferably polypropylene. The outermost film may contain an UV protective agent.

FIG. 4 shows yet another alternative, in which a laminate made of polyamide film 2b and a film 2c made of another thermoplastic has been glued to the substrate 1. On top of this, forming the outermost layer, there is a film 2c also made of thermoplastic, which contains filler material 3. The filler material may be a solid material as known in the composite technology, such as a filler agent, pigment or fibre reinforcement used in plastics. Corresponding filler materials can naturally be used in the lower films, too. As an alternative to or together with the filler material, there may also be an UV protective agent in the outermost film.

FIG. 5 shows one method for surfacing the substrate 1. The substrate 1, an adhesive film 2a impregnated with reactive adhesive, and a polyamide film 2b are placed on top of each other and pressed together by application of pressure and heat (arrow P). Instead of only a polyamide film 2b there may also be a laminate made of a polyamide film 2b and another thermoplastic film 2c, in which the films have been directly attached to each other before gluing to the substrate, and. in this, a ready-made commercial laminate can be used or the laminate can be produced according to the required surfacing. It is possible to have, for example, a laminate made of a polyamide film and a polyolefin film mentioned above.

FIG. 6 shows a diagrammatic view of a second method, in which the lowest polyamide film 2b and one or more thermoplastic films 2c on top of it are directly attached to each other at the same pressing stage where the polyamide film 2b is glued to the substrate 1. Instead of only a polyamide film 2b, there may also be a laminate made of the polyamide film 2b and another thermoplastic film 2c, in which laminate the films have been attached directly to each other before gluing them to the substrate, and in this, a ready-made commercial laminate can be used or the laminate can be produced according to the required surfacing. For example, a laminate made of polyamide film and a polyolefin film as mentioned above can be used. The temperature used in surfacing can be adjusted in such a way that the thermoplastic layers adhere to each other and the adhesive layer 2a hardens at the same work stage.

FIG. 7 shows a diagrammatic vie v of a third method, in which the multi-layer surfacing to be placed on the substrate 1 is produced at a separate work stage, in which one or more thermoplastic films 2c are further attached on top of the polyamide film 2b or the laminate made of a polyamide film 2b and some other thermoplastic film 2c, at a suitably high temperature at the first hot-press stage. The ready-made multi-layer structure thus produced, in which the polyamide film 2b forms the lowest layer, is attached by means of the adhesive film 2a to the substrate 1 at the next hot-press stage. The temperatures of the stages can be adjusted according to the adhesion temperature of the thermoplastic and the hardening temperature of the adhesive (usually lower than the former).

FIG. 8 shows an alternative in which adhesive films 2a and thermoplastic films 2c, of which at least the lowest is a polyamide film 2b, are laid alternately on top of the substrate 1. After this the surfacing 2 is produced in one hot-press stage.

Finally, FIG. 9 shows an alternative in which thermoplastic films 2c, at least the lowest of which is a polyamide film 2b, are attached to each other by means of adhesive films 2a at the first hot-press stage. The ready-made multi-layer structure thus obtained, in which a polyamide film 2b is the lowest layer, is at the next hot-press stage glued by means of an adhesive film 2a to the substrate 1.

In gluing the layers to the substrate 1 and to each other, in all the above-mentioned methods, ordinary hot-presses can be used, in which the substrate and the layers placed on top of it are pressed against each other at a certain pressure between the pressing surfaces, and a certain temperature is simultaneously applied to the layers placed on the substrate 1. A desired pattern or design can simultaneously be provided on the outer surface by means of the pressing surface, or it may be smooth.

The adhesive film 2a between one or more films 2b, 2c and the substrate 1 may be a single-layer film, or it can be made up of several layers placed on top of each other, for example according to the amount of adhesive desired. These layers may contain thin intermediate layers which do not contain adhesive but which adhere well to the adhesive layers. The most suitable amounts of adhesive are approximately 10–300 g/m$^2$, preferably 50–150 g/m$^2$. The thickness of the polyamide film 2b is most often below 200 $\mu$g, for example 15–150 $\mu$g. A polyamide film can in principle be as thin as it is possible to achieve in film manufacturing, and in this case the films made of some other thermoplastic can be thicker than this, because the purpose of the polyamide is to function as a good base for the adhesion of other thermoplastics. In a laminate made of a polyamide film and another thermoplastic, the thickness of the layer made of other thermoplastic, comprising one or more films, is most often 30 $\mu$g–5 mm.

Although the figures show a substrate 1 that has been surfaced only on one side, it can also be surfaced with a surfacing material relating to the invention on both sides, in which case the surfacing materials do not necessarily have to be identical on both sides. In addition, the substrate 1 can also be surfaced on the opposite side with a surfacing material other than a surfacing material relating to the invention. Surfacing can be applied to both sides at subsequent hot-press stages, for example. Likewise, it is possible that the adhesive film remains the outermost layer of the surfacing material. For example, in FIG. 1 there may be a hardened adhesive film 2a on top of the polyamide film 2b, forming the outermost layer, or in FIG. 3, the outermost thermoplastic layer 2c may be missing, in which case the outermost layer is a hardened adhesive film 2a.

The board-like substrate 1 of constant thickness shown in the figures is straight. It is, however, also possible to surface curved board-like substrates on the same principles, as flexible films used in the surfacing (thermoplastic films and adhesive films) adapt well to various forms, whether placed as separate films or as a prefabricated multi-layer structure on top of the substrate.

Nor does the invention exclude the possibility of adding to the surfacing material 2 comprising one or more thermoplastic films attached to each other either directly or by means of adhesive layers, at a later work stage, on top of the outermost thermoplastic film of the surfacing material 2, one or more further thermoplastic films. This may be done by means of hot-pressing or also by spreading ; molten polymer material and cooling it to form a uniform surface film.

The invention is illustrated in the following with examples that do not, however, limit the invention.

In the examples, phenol-formaldehyde resin is used as the phenolic resin. It is, however, obvious that it is also possible to use other reactive adhesives that are to be spread in a liquid form or impregnated into a carrier in a liquid form, the components of which react with each other and produce a structure that attaches the various layers to each other. In the examples, the first of the numerical values referring to adhesive films, separated by means of a slash, refers to the grammage of the carrier material in grams and the latter to the total grammage of the resin and the carrier in grams.

EXAMPLE 1

A 50-$\mu$m-thick polyamide film was glued with phenolic resin, spreading 150 g/m$^2$, on 27 mm birch plywood in a hot-press, pressure 1.5 N/mm$^2$, time 7 minutes and temperature 135° C.

EXAMPLE 2

A laminate made of polyamide and polypropylene PA30/PP100 (thickness of PA 30 $\mu$m and thickness of PP 100 $\mu$m) was glued with 40/120 phenolic film (a paper impregnated with phenolic resin) to a 12-mm mixed plywood in a hot-press, pressure 1.8 N/mm$^2$, time 7 minutes and temperature 135° C.

EXAMPLE 3

Polypropylene plastic 1000 g/m$^2$ was added to the polypropylene surface of a polyamide polypropylene film PA30/PP50, pressure 2.2 N/mm$^2$, time 2 minutes, temperature 190° C. This laminate was glued by its polyamide side to the surface of a 27-mm birch plywood with 40/120 phenolic film in a hot-press, pressure 1.8 N/mm$^2$, time 10 minutes, temperature 140° C.

EXAMPLE 4

An FF/PA layered blank was laid on a 30-mm birch plywood. In the layered structure, there were against the plywood two 40/120 phenolic films, on top of which there was a polyamide film 100 (100 $\mu$m), and on top of which there were further two 40/120 phenolic films and PA100. This was continued until there were 8 phenolic films and 4 polyamide films in one layered structure. The blank was pressed in a hot-press at a pressure of 1.8 N/mm$^2$, time 9 minutes, temperature 140° C.

EXAMPLE 5

An adhesive film 30/77 g/m$^2$ (brownish, undyed phenolic resin), an opaque, pigmented paper 80 g/m$^2$, a lacquer film 40/120 g/m$^2$ (colourless phenolic resin) and a laminate made of a polyamide film and white pigmented polypropylene film 30/100 g/m$^2$ were layered on top of plywood. The layered structure was pressed in a hot-press under the following conditions: temperature 135° C., pressure 1.8 N/mm$^2$, time 7 minutes. In pressing the layered structure an even pressing plate or alternatively, a pressing plate with a design/pattern can be used. By using an opaque, pigmnented paper, the opacity of the surfacing can be increased and the visibility of changes in colour and faults in the board to be surfaced can be prevented.

What is claimed is:

1. A surfaced wood-based board comprising a substrate made of wood material and a surfacing comprising at least one thermoplastic layer,
    wherein the surfacing comprises a polyamide film which has been glued to a surface of the substrate by means of a reactive adhesive layer; and one or more thermoplastic films attached directly on top of the polyamide film,
    wherein the reactive adhesive layer is an adhesive paper impregnated with a reactive adhesive.

2. A board as claimed in claim 1, wherein the reactive adhesive layer is based on phenolic resin, polyester resin, epoxy resin, isocyanate adhesive or polyurethane adhesive.

3. A board as claimed in claim 1, wherein the thermoplastic film attached directly to the top of the polyamide film is made of polyolefin.

4. A board as claimed in claim 3, wherein the thermoplastic film forms an outer surface of the surfaced board.

5. A board as claimed in claim 4, wherein at least the outermost of the thermoplastic films has been furnished with filler material.

6. A board as claimed in claim 5, wherein the filler material is selected from the group consisting of filler agents, pigment, fibre reinforcements, UV protection agents, and mixtures thereof.

7. A method for surfacing a wood-based board, in which a surfacing material comprising at least one thermoplastic layer is attached to a substrate made of wood material,
    wherein the surfacing is produced by layering on top of the substrate an adhesive paper impregnated with a reactive adhesive, a polyamide film, an adhesive paper impregnated with a reactive adhesive, and thermoplastic film.

8. A method as claimed in claim 7, wherein the surfacing is produced by gluing to the substrate a ready-made multi-layer structure consisting of a polyamide film and one or more thermoplastic films which has been produced at a previous work,
    wherein the multi-layer structure is glued to the substrate with an adhesive paper impregnated with a reactive adhesive.

9. A method as claimed in claim 7, wherein the substrate is surfaced by hot-pressing.

10. A method as claimed in claim 7, wherein the substrate is selected from the group consisting of plywood, particle board, fibreboard, and a substrate made of sawn timber.

11. A surfaced wood-based board comprising a substrate made of wood material and a surfacing comprising at least one thermoplastic layer, wherein the surfacing comprises a polyamide film which has been glued to a surface of the substrate by means of a reactive adhesive layer, and one or more thermoplastic films attached directly on top of the polyamide film, and wherein the polyamide film is a polyolefin.

12. A board as claimed in claim 11, wherein the reactive adhesive layer is based on phenolic resin, polyester resin, epoxy resin, isocyanate adhesive or polyurethane adhesive.

13. A board as claimed in claim 11, wherein the outermost thermoplastic film forms an outer surface of the surfaced board.

14. A board as claimed in claim 11, wherein at least the outermost of the thermoplastic film has been furnished with filler-material.

15. A board as claimed in claim 14, wherein the filler material is selected from the group consisting of filler agents, pigment, fibre reinforcements, UV protection agents, and mixtures thereof.

16. A method for surfacing a wood-based board, in which a surfacing material comprising at least one thermoplastic layer is attached to a substrate made of wood material, wherein the surfacing is produced by layering on top of the substrate a reactive adhesive layer, a polyamide film, a reactive adhesive layer, and thermoplastic film, wherein the polyamide film is a polyolefin.

17. A method as claimed in claim 16, wherein at least one of the reactive adhesive layers is a paper impregnated with reactive adhesive.

18. A method as claimed in claim 16, wherein the surfacing is produced by gluing to the substrate a ready-made multi-layer structure consisting of a polyamide film and one or more thermoplastic films which has been produced at a previous work, wherein the multi-layer structure is glued to the substrate with an adhesive paper impregnated with a reactive adhesive.

19. A method as claimed in claim 16, wherein the substrate is surfaced by hot-pressing.

* * * * *